(12) United States Patent
Signoretto (10) Patent No.: US 9,623,805 B2
(45) Date of Patent: Apr. 18, 2017

(54) HOLDER OF A TONNEAU COVER OR SEPARATION DEVICE FOR A LUGGAGE SPACE OF A VEHICLE

(71) Applicant: FIBRO S.p.A., Cumiana (IT)

(72) Inventor: Carlo Teresio Signoretto, Turin (IT)

(73) Assignee: FIBRO S.p.A. (IT)

( * ) Notice: Subject to any disclaimer, the term of this patent is extended or adjusted under 35 U.S.C. 154(b) by 0 days.

(21) Appl. No.: 14/766,485

(22) PCT Filed: Feb. 27, 2014

(86) PCT No.: PCT/IB2014/059314
§ 371 (c)(1),
(2) Date: Aug. 7, 2015

(87) PCT Pub. No.: WO2014/132224
PCT Pub. Date: Sep. 4, 2014

(65) Prior Publication Data
US 2015/0375683 A1    Dec. 31, 2015

(30) Foreign Application Priority Data

Feb. 27, 2013    (IT) .............................. TO2013A0160

(51) Int. Cl.
*B60R 5/04*    (2006.01)
*E06B 9/42*    (2006.01)

(52) U.S. Cl.
CPC ................ *B60R 5/047* (2013.01); *E06B 9/42* (2013.01)

(58) Field of Classification Search
CPC .................................. B60R 5/047; E06B 9/42
(Continued)

(56) References Cited

U.S. PATENT DOCUMENTS 5,813,449 A * 9/1998 Patmore .................. B60R 5/047
160/24
6,125,908 A * 10/2000 Ament .................... B60R 5/047
160/323.1
(Continued)

FOREIGN PATENT DOCUMENTS

DE        10218632        5/2003
DE        10341851        3/2005
(Continued)

OTHER PUBLICATIONS

Corresponding International Search Report and Written Opinion for PCT/IB2014/059314 dated Jul. 23, 2014.

*Primary Examiner* — Blair M Johnson
(74) *Attorney, Agent, or Firm* — The Belles Group, P.C.

(57) ABSTRACT

Holder of a tonneau cover of a vehicle including an internally hollow box-like body accommodating the tonneau device and provided with a longitudinal slot for extracting a retractable member of the tonneau device, and with opposite closed ends, received in use in pockets carried by the vehicle body and provided with releasable coupling means for coupling to the pockets; in which the box-like body includes: two half-shells thermoformed preferably in one single piece together with a plastic hinge defined by at least one deformable tongue, which joins the half-shells to each other along respective opposite first longitudinal sides of the half-shells; the half-shells are reciprocally couplable by overlapping with respective facing concavities thereof; and a pair of opposite cup-shaped heads which, with the half-shells coupled, are fitted on corresponding opposite ends of the half-shells, to form the ends of the box-like body.

15 Claims, 5 Drawing Sheets

(58) Field of Classification Search
USPC .............................................. 160/24, 370.22
See application file for complete search history.

(56) References Cited

U.S. PATENT DOCUMENTS

| | | |
|---|---|---|
| 2005/0023854 A1 | 2/2005 | Woerner et al. |
| 2007/0007783 A1* | 1/2007 | Schlecht ................. B60R 5/047 296/24.4 |
| 2011/0094690 A1* | 4/2011 | Lin .......................... B60R 5/047 160/298 |
| 2015/0375683 A1* | 12/2015 | Signoretto .............. B60R 5/047 296/24.43 |

FOREIGN PATENT DOCUMENTS

| | | |
|---|---|---|
| EP | 1852293 | 11/2007 |
| WO | WO 9801321 A1 * | 1/1998 |

* cited by examiner

HOLDER OF A TONNEAU COVER OR SEPARATION DEVICE FOR A LUGGAGE SPACE OF A VEHICLE

PRIORITY

Priority is claimed as a national stage application, under 35 U.S.C. §371, to international patent application No. PCT/IB2014/059314, filed Feb. 27, 2014, which claims priority to Italian patent application TO2013A000160, filed Feb. 27, 2013. The disclosures of the aforementioned priority applications are incorporated herein by reference in their entirety.

TECHNICAL SECTOR OF THE INVENTION

The present invention concerns a holder of a tonneau cover and/or separation device for a luggage space of a vehicle.

BACKGROUND ART

It is known that the luggage space of hatchback vehicles is provided with a tonneau cover and/or separation device, the only difference between the two, apart from the dimensional differences, being that the separation device is provided with a retractable member consisting of a mesh, while the tonneau cover is provided with a retractable member consisting of flexible sheet material.

The tonneau cover and/or separation device is accommodated inside a box holder, generally produced by means of a profile in extruded aluminium or rolled steel sheet, provided at the opposite ends with members for coupling and fastening to respective support pockets, which are carried by the vehicle body and which therefore serve to fix the holder to the body in a removable manner. A holder of this type is illustrated for example in DE10252490A1.

The holders of the type described are not without drawbacks. Firstly, forming the box holder in metal involves high production costs and makes the "holder-tonneau device" unit very heavy. Furthermore, assembly of the tonneau device inside the box holder can be difficult. Lastly, the holder cannot be integrated with other internal vehicle body or finishing elements, for example shelves for objects in general or umbrellas, and has a shape (necessarily linear) and a surface finish which often do not integrate with those adopted by the manufacturer for the vehicle interior. A further drawback lies in the fact that removal and transport of the tonneau cover are difficult, in particular due to the fact that in order to disconnect the support pocket coupling and fastening members to allow removal of the holder with the relative tonneau device, the user must operate at the ends of the holder, which is not always easy.

DE10341851 and US2005/023854 do not solve these problems, since they simply concern containers that can be coupled to the tonneau device.

The object of the present invention is to overcome the drawbacks described.

In particular, a first object of the invention is to provide a holder of a tonneau cover and/or separation device for a luggage space of a vehicle which is easy and inexpensive to produce, which allows any shapes, profiles and surface finishes to be adopted for the box holder, and which allows rapid easy assembly of the tonneau device inside the box holder.

Furthermore, a second object of the invention is to provide a holder of a tonneau cover and/or separation device for a luggage space of a vehicle that is easy to transport for a user when removed and which is easy and quick to remove, in particular facilitating the user in any assembly/disassembly and transport operations of the "holder-tonneau device" unit.

SUMMARY OF THE INVENTION

The present invention concerns a holder of a tonneau cover and/or separation device for a luggage space of a vehicle as defined in claims 1 and 6 and in the related dependent claims.

The box holder of the invention is in particular formed by an internally hollow box-like body accommodating the tonneau device therein and provided with a longitudinal slot for extracting the retractable member of the tonneau device, and by releasable coupling means for coupling to the support pockets of a vehicle body carried at closed ends of the box-like body.

According to one embodiment of the invention, the box-like body comprises: two thermoformed half-shells reciprocally couplable by overlapping with respective concavities thereof facing each other and with respective opposite first longitudinal sides thereof arranged adjacent obtained integral in one single piece from one single sheet of thermoplastic material together with a plurality of plastic hinges defined by at least one deformable tongue, which joins the half-shells and/or respective half-shell sectors adjacent to one another; and a pair of opposite cup-shaped heads which, with the half-shells coupled, are fitted on/arranged integral with corresponding opposite ends of the half-shells, to form the closed ends of the box-like body; opposite second longitudinal sides of the half-shells, opposite to the first sides, defining, with the half-shells coupled, the longitudinal slot of the box-like body, being arranged spaced apart from one another.

In this way, production of the box holder is made simple, inexpensive and is freed by the obligation of a linear shape, since curved profiles can be adopted for the two half-shells, for example, which match the internal profiles of the vehicle interior. Furthermore, with the usual known thermoforming techniques, surface finishes of different types can be adopted—smooth, embossed, in fabric, in imitation leather, etc.—and the holder can be integrated with other elements or accessories, such as shelves. Lastly, it is extremely simple and rapid to assemble the tonneau device inside the box holder, when the box-like body is still "open", before coupling by overlapping the two half-shells, the latter being formed open and positioned side by side longitudinally on the same plane.

Also thanks to the structure described above, the box holder is provided on the box-like body with a transport handle, carried by a part of the box-like body, for example a part of the half-shell, which will remain facing upwards; furthermore, control members for the releasable coupling means, which are carried by the heads, can be easily integrated in the handle.

BRIEF DESCRIPTION OF THE DRAWINGS

Further characteristics and advantages of the present invention will become clear from the description provided below of a preferred embodiment thereof, with possible variations, purely by way of non-limiting example and with reference to the accompanying drawings, in which.

DETAILED DISCLOSURE

With reference to FIGS. 1 to 4, the number 1 indicates as a whole a box holder for a known tonneau cover and/or separation device for a luggage space of a vehicle not illustrated for the sake of simplicity. In the non-limiting embodiment illustrated, the tonneau device 2 is a cover device comprising: a tubular winding drum 3 for a flexible retractable member 4 defined by a sheet material that can be wound on the drum 3; and a winding spring 5 arranged inside the drum 3, illustrated for the sake of simplicity only in FIG. 1. In the case of a separation device, the retractable member 4 consists simply of a mesh instead of a sheet of flexible material.

The box holder 1 according to the invention comprises an internally hollow box-like body 6, accommodating therein the tonneau device 2 and provided with a longitudinal slot 7 (FIGS. 3 and 4) for extraction in use of the retractable member 4 of the tonneau device 2.

The box-like body 6 has (FIGS. 1 and 4) opposite ends 8 and 9 closed, adapted to be received in use in respective support pockets, known and not illustrated for the sake of simplicity, carried by the vehicle body.

The box holder 1 furthermore comprises releasable coupling means 10 (FIG. 1), of known type, for coupling to said pockets, carried by the closed ends 8 and 9 of the box-like body 6.

Figure 2:
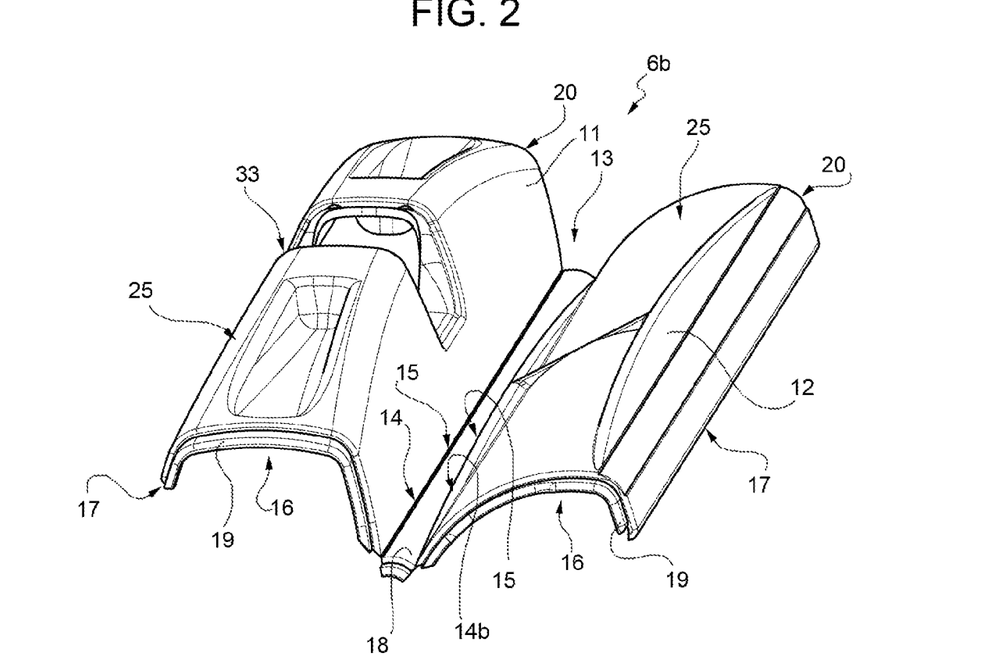
FIG. 2 illustrates a frontal three-quarter perspective view of a fundamental component of the box holder according to the invention, illustrated in a production configuration.
Figure 3:
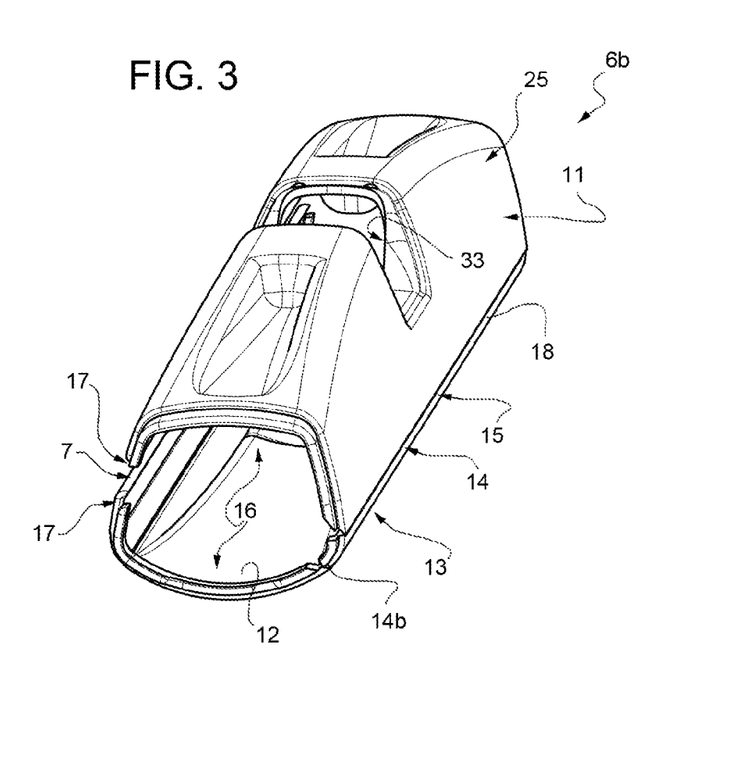
FIG. 3 illustrates a frontal three-quarter perspective view of the same component as FIG. 2, illustrated in a configuration of use.

According to an important aspect of the invention, the box-like body 6 comprises (FIG. 2) two concave substantially rigid half-shells 11 and 12 which, unlike the known art, are obtained by thermoforming of a sheet of thermoplastic material; in the non-limiting example illustrated, the half-shells 11 and 12 are thermoformed in one single piece 6b together with at least one plastic hinge 13 defined by at least one deformable tongue 14, which joins the half-shells 11 and 12 to each other along respective opposite first longitudinal sides 15, adjacent to each other, of the half-shells 11,12, so that the half-shells 11,12 are reciprocally couplable by overlapping with respective concavities 16 thereof facing to each other and with their corresponding first longitudinal sides 15 arranged adjacent, as illustrated in FIG. 3.

Therefore, in the example illustrated, the piece or component 6b formed of the half-shells 11,12 and of the plastic hinge 13 can take on two different configurations; an "open" configuration, illustrated in FIG. 2, which is the production configuration of the piece or component 6b, which is thermoformed by a known process starting from one single flat sheet made of a thermoplastic material, with the half-shells 11 and 12 aligned on one single plane; and a "closed" configuration, illustrated in FIG. 3, which is the configuration of use of the piece or component 6b, in which the half-shells 11 and 12 have been rotated by means of the hinge 13 in the direction of the arrows (FIG. 2).

In particular, each half-shell 11,12 is delimited by a respective side 15 and by an opposite longitudinal side 17, parallel to the side 15. The sides 17, in the position of FIG. 2, are distal; vice versa, in the position of FIG. 3, the sides 17 are in a vicinal position, immediately adjacent to each other, but vertically spaced apart from each other, so as to define/delimit, with the half-shells 11,12 coupled to each other (i.e. after the rotation), the slot 7.

It should be noted that the slot 7 which is delimited by the sides 17 of the half-shells 11,12 is an empty space which allows only the passage of the retractable member 4 but does not allow access to the inside of the box-like body 6.

Preferably, the at least one deformable tongue 14 joins the half-shells 11,12 for substantially the entire length of the sides 15, with the exception of respective opposite terminal segments or stretches thereof which delimit respective opposite ends 19,20 of the half-shells 11,12.

In the non-limiting embodiment example illustrated, the plastic hinge 13 comprises the tongue 14 and an identical second deformable tongue 14b both obtained integral in one piece with the half-shell 11 and with the half-shell 12 respectively, substantially along the entire corresponding side 15 of each of them, with the exception already mentioned of the terminal segments of the sides 15 delimiting the ends 19 and 20; the plastic hinge 13 furthermore comprises a half-shell section or rigid curved (concave) rib 18 of the same length as the half-shells 11,12 and obtained integral in one piece with the tongues 14,14b so as to connect them to each other throughout the length of said tongues 14,14b, so as to define a rotation axis of the plastic hinge 13.

It is evident to a person skilled in the art that an identical result can be obtained, according to possible variations not illustrated for the sake of simplicity, obtaining the half-shells 11,12 by thermoforming as before but as two separate elements independent of each other, on condition that they are couplable by overlapping each other, with the concavities 16 facing and the sides 15 arranged strictly adjacent to each other, i.e. in contact, for example simply overlapped by contact, rigidly connected by snap fitting or dovetail coupling or even just simply resting on each other.

In any case, the box-like body 6 must comprise, according to the invention, a pair of opposite cup-shaped heads 21,22 which, with the half-shells 11,12 coupled, are fitted respectively on the (i.e. above the) ends 20 and 19 of the half-shells 11,12 or in any case are mounted/fixed integral with the ends 20 and 19 of both the half-shells 11,12, to form the closed ends 8,9 of the box-like body 6; the heads 21,22 are each provided, in an appropriate position, with an indentation 23 (visible in FIG. 4 only for the head 21) which, with the half-shells 11,12 coupled, defines a closed end of the slot 7, coupling flush with the sides 17 which, with the half-shells 11,12 coupled, must remain spaced apart, as already described.

The opposite ends 20, 22 of the half-shells 11,12 are therefore open ends, defined by lower-thickness edges of the half-shells 11,12 so that, for example, the piece or component 6b, with the half-shells 11,12 coupled (FIG. 3), has a tubular form, but can have any perimeter profile; in the example illustrated, said profile is curved.

The cup-shaped heads 21,22 are coupled on the lower-thickness edges defined by the ends 19, 20, i.e. above the ends 19 or radially on the outside of the ends 19, so that an outer surface 24 of the heads is arranged substantially flush with a corresponding outer lateral surface 25 of the half-shells 11,12 and, above all, so that the heads 21,22 sandwich the half-shells 11,12 to each other, preventing the separation thereof (by rotation in the case of hinge coupling along the sides 15).

In particular, the cup-shaped heads 21,22, in the non-limiting example illustrated, are driven by interference or snap-fitting onto the ends 19,20 and/or, in the preferred case in which also the heads 21,22 are obtained in a synthetic plastic material, for example by moulding, are thermo-welded or ultrasound-welded to the lower-thickness edges of the half-shells 11,12 defined by the ends 19,20. The cup-shaped heads 21,22 can also be glued, vibration-welded or hot-welded or dovetail coupled or coupled in any other suitable manner on the/to the ends 19,20, on condition that they are adapted to maintain, in a coupling position with the ends 19,20, the half-shells 11,12 coupled to each other by overlapping in the manner described, preventing the separation thereof.

According to one embodiment of the invention, the half-shells 11,12 are shaped so that, with the half-shells 11,12 coupled, the first sides 15 and the second sides 17 of the half-shells 11,12 are arranged on offset planes, so that the plastic hinge 13 and the slot 7 are, in the configuration of use, reciprocally offset in height, thus giving the box-like body 6 greater rigidity.

Figure 1:
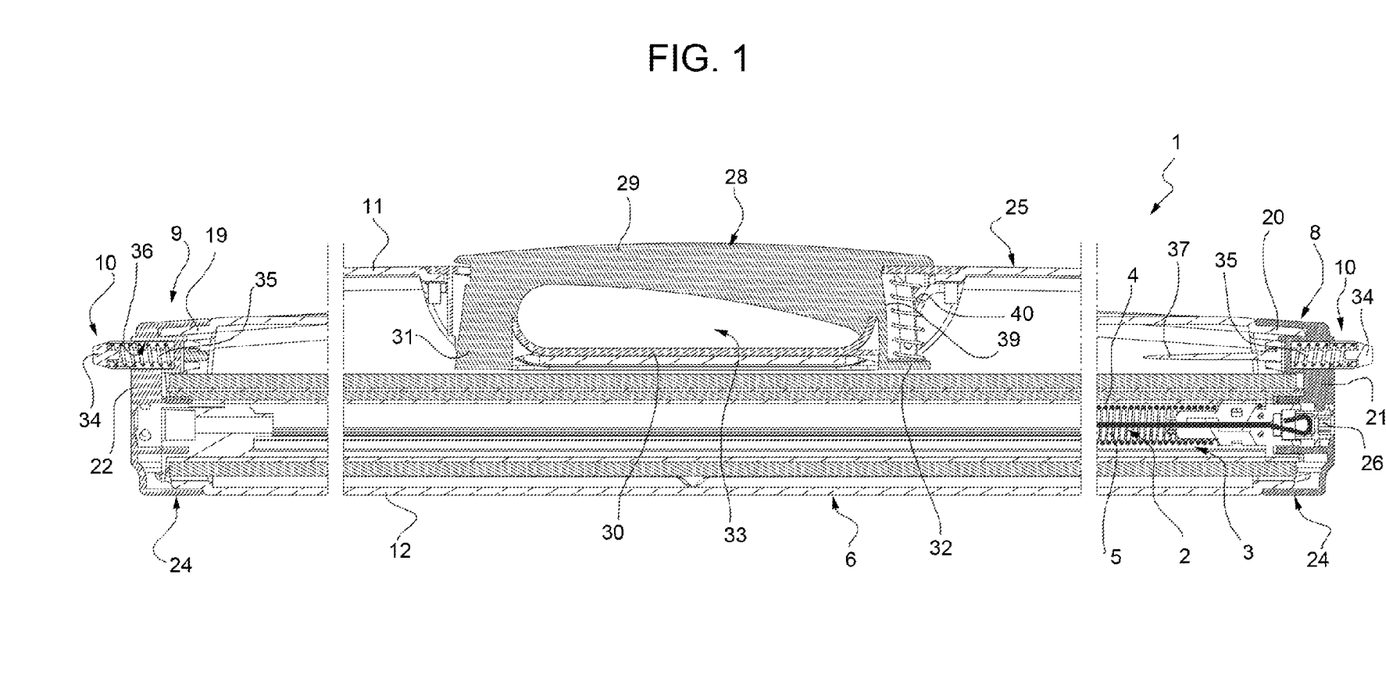
FIG. 1 illustrates a longitudinal view in elevation with section through the vertical plane of a box holder according to the invention, illustrated in an intermediate part thereof on an enlarged scale, provided inside with a known tonneau device.

According to one embodiment of the invention, the component 6b of the box-like body 6 which, forgoing a series of possible advantages, could also be obtained from an extruded metal profile or a sheared and bent metal sheet, is made so that the cup-shaped heads 21,22 support on the inside of the box-like body 6 opposite ends of the tonneau device 2, in the case in point of the drum 3, so that the tonneau device 2 is supported sandwiched between the cup-shaped heads 21,22, in the example illustrated without cooperating in any way with the half-shells 11,12 and/or with the component 6b, however obtained. In particular, at least the head 21 is provided with a bush 26, preferably metallic, mounted driven into a seat 27 of the head 21 and adapted to receive by anchoring the spring 5 in a known manner (FIG. 1). In any case, the assembly formed of the cup-shaped heads 21,22 together with the metal tubular member constituting the drum 3 and forming the holder of the tonneau device 2, is integral with the two half-shells 11,12 at least through the heads 21,22 and contributes to making the box holder 1 stronger as a whole.

According to a non-secondary embodiment of the invention, the half-shell 11, arranged in use facing upwards, therefore defining a part of the box-like body 5 arranged in use facing upwards, carries integral with it a transport handle 28, arranged longitudinally along the centre line. The handle 28 is present according to the invention also if the box-like body 6 is obtained by means of a tubular metal component 6b, in bent or extruded sheet metal, coupled with the heads 21,22.

Figure 4:
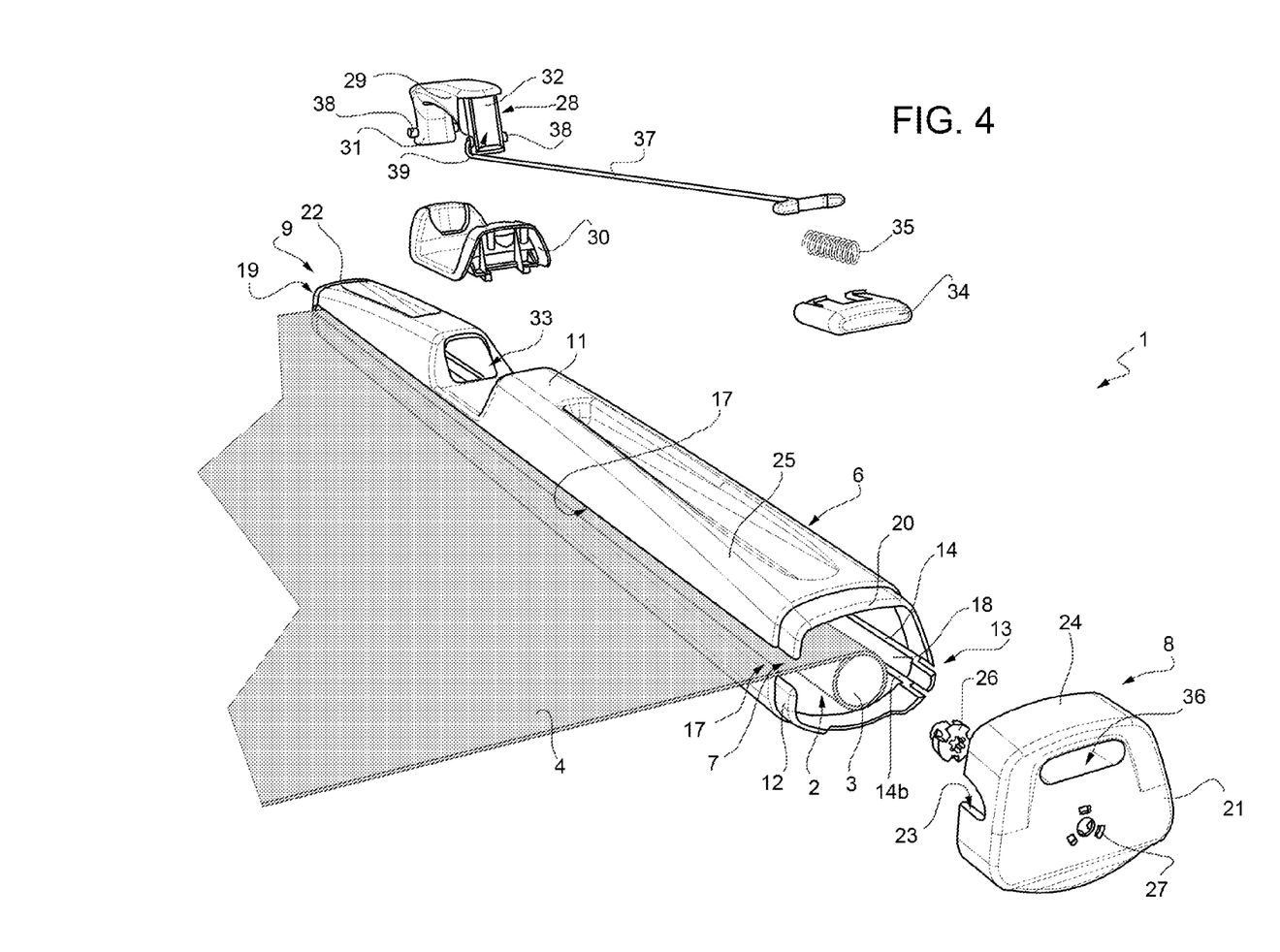
FIG. 4 illustrates a frontal exploded three-quarter perspective view of the box holder of FIG. 1, in the configuration of use.
Figure 5:
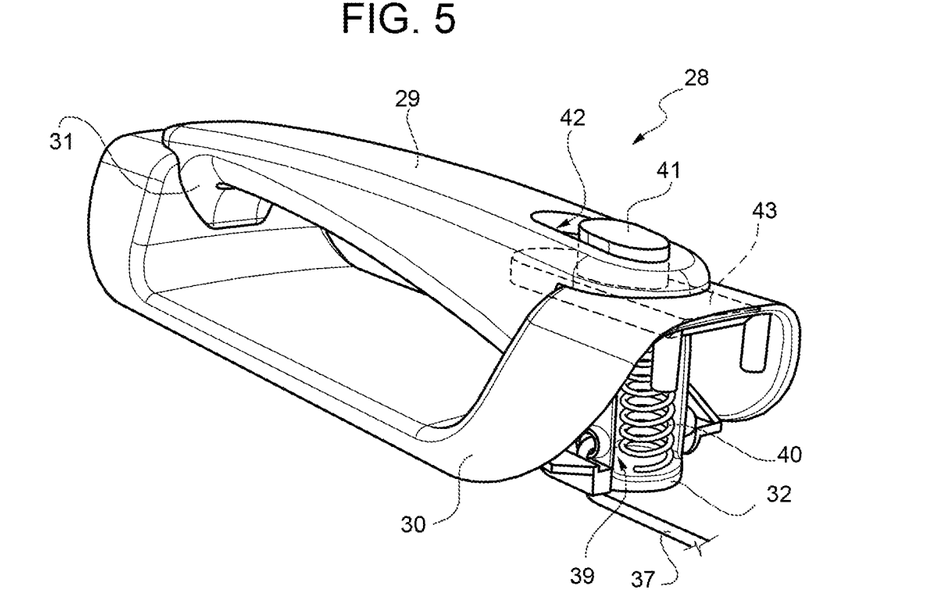
FIG. 5 illustrates on an enlarged scale a detail of the handle of the box of FIGS. 1 and 4 integrating a control member.

According to the embodiment of FIGS. 1, 4 and 5, the handle 28 comprises a grip member 29 with curved profile and overall U shape, and a saddle-shaped finishing badge or plate 30, crossed through by opposite L-shaped ends 31 and 32 of the grip member 29 and fitted to close a through seat 33 for the grip member 29 obtained through the upper part of the box-like body 6, in the case in point through the half-shell 11 in a position such as to face upwards in use.

The releasable coupling means 10 comprise: at least one lockbolt 34 (FIGS. 1 and 4) slidingly carried, parallel to the longitudinal slot 7 (therefore in the example illustrated parallel also to the plastic hinge 13 and to the sides 15) and against the bias of a first contrast spring 35, within a through seat 36 obtained through one of the heads 21,22 (in the non-limiting example illustrated, there are two lockbolts 34 with relative seats 36 and springs 35), the contrast spring 35 normally maintaining the respective lockbolt 34 in a position extracted from the seat 36 (illustrated in FIG. 1), in which a portion of the lockbolt 34 protrudes externally from the box-like body 6; and a tie rod 37 accommodated within the box-like body 6, in the non-limiting case illustrated, within the half-shell 11 arranged in use in an upper position, i.e. in a position adjacent to the handle 28 and therefore, in the example illustrated, within the half-shell provided with the handle 28.

The tie rod 37 is connected integral with at least one lockbolt 34, in the example illustrated that of the head 21.

The releasable coupling means 10 furthermore comprise a control member, described in detail below, adapted to pull the tie rod 37 when it is actuated, for attracting the lockbolt 34 connected to the tie rod 37 into a retracted position in the seat 36, in which the lockbolt 34 is not adapted to block in use the head 21 in a respective support pocket, not illustrated. In these conditions, even though there are two lockbolts 34 and only one is controlled by the tie rod 37, it is nevertheless possible to insert/remove the box holder 1 from the support pockets for the same positioned on the vehicle, by simply arranging the box-like body 6 slanting, for example by exerting an appropriate traction and rotation on the handle 28.

According to one embodiment of the invention, the control member for the tie rod 37 is integrated in the handle 28.

According to the embodiment of FIGS. 1, 4 and 5, the control member for the tie rod 37 consists of the grip member 29, which is restrained in a pivoting manner to the part 11 of the box-like body 6 facing upwards in use, therefore to the half-shell 11; in fact, the L-shaped end 31 is restrained in a rotating manner, by means of a pair of pins 38 (FIG. 4), to the half-shell 11, in a direction perpendicular to the slot 7, therefore also to the plastic hinge 13 and to the sides 15; the L-shaped end 32 is provided with an inner recess 39 accommodating a second contrast spring 40, helical, arranged with an own winding axis perpendicular both to the slot 7 and plastic hinge 13, and to the pins 38, i.e. in use arranged substantially vertical; the spring 40 is sandwiched between the end 32 and a portion of inner surface of the badge or plate 30, which is snappingly restrained, integral, to the part facing in use towards the top of the box-like body 6 defined by the half-shell 11.

In this way, the spring 40 contrasts, in use, the upward rotation which the pins 38 allow the grip member 29 when the latter is gripped by the user and pulled upwards: the tie rod 37 is restrained integral with the end 32 (FIGS. 4 and 5) and is therefore pulled by rotation of the grip member 29, releasing the lockbolt 34.

According to the variation illustrated in FIG. 5, the handle 28 can be provided with a button 41 accommodated in a through seat 42 obtained through the grip member 29. The button 41 slides in the seat 42 parallel to the slot 7 and, in the case illustrated, to the plastic hinge 13, and is obtained integrally in one piece with a safety lockbolt 43, adapted to selectively make the grip member 29 integral with the plate or badge 30 and/or directly with the part arranged in use towards the top of the box-like body 6, in the case in point defined by the half-shell 11, to block rotation of the grip member 29 when the button 41 is pushed towards the end 32.

Figure 6:
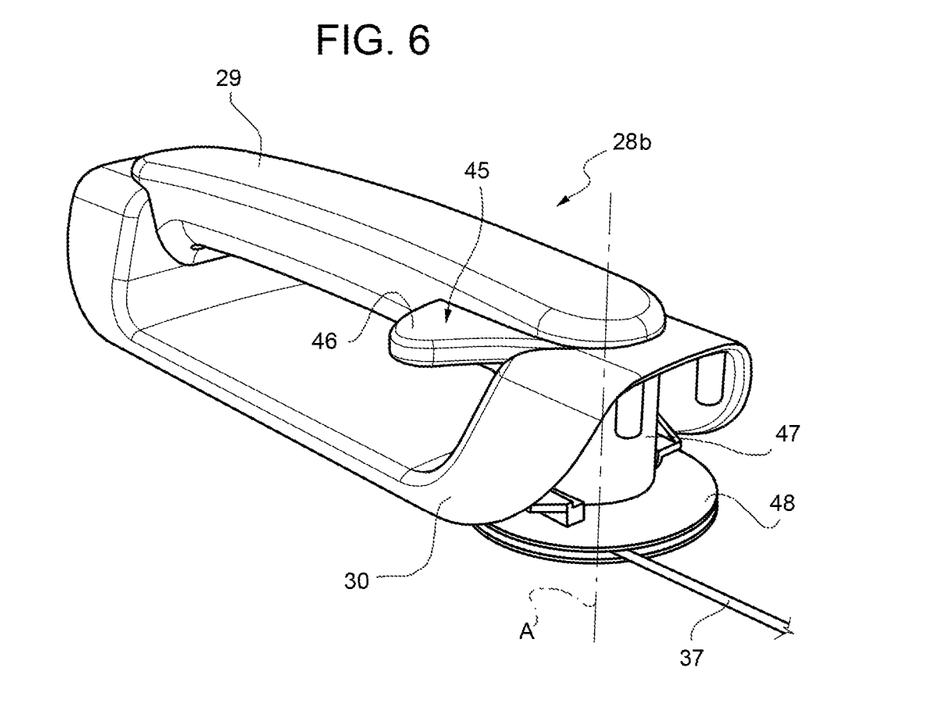
FIG. 6 illustrates a possible variation of the handle and relative control member.

According to the variation illustrated in FIG. 6, the handle 28 can be replaced in the box holder 1 described so far by a handle 28b, in which the grip member 29 and the badge 30 are integral, hence the handle 28b is a fixed handle, unlike the handle 28 which is a pivoting handle. The control member then consists of a lever 45 laterally carried by the handle 28b so as to protrude, in particular from the grip member 29, hinged on an axis A perpendicular to the longitudinal slot 7 and, in the example illustrated, to the plastic hinge 13 (in practice the axis A is parallel to the winding axis of the spring 40 in the handle 28) and eccentrically connected, at the rotation axis A thereof, to said tie rod 37. In particular the lever 45 is L-shaped and has two wings 46 and 47, the wing 46 extending laterally so as to protrude from the grip member 29 and the wing 47 being coupled in rotation, around the axis A, directly with the badge 30 and/or with the end 32 of the grip member 29 and terminating with a disc or drum 48 to which the tie rod 37 is tangentially fixed.

Figures 7, 8:
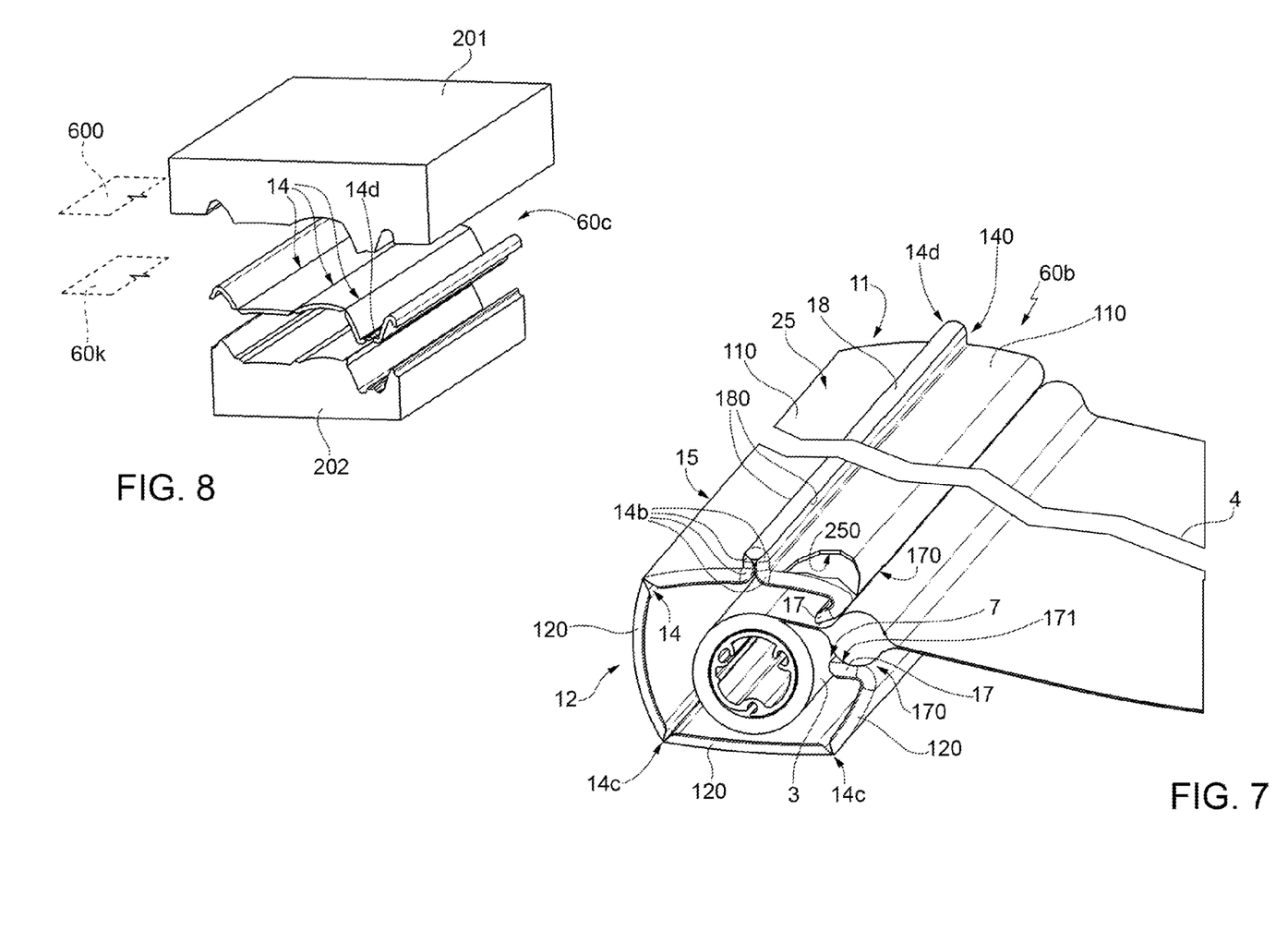
FIG. 7 illustrates a frontal three-quarter perspective view of a different embodiment of the box holder according to the invention, with parts removed for the sake of simplicity.
FIG. 8 schematically illustrates the technique of forming a main component of the box holder of the invention, referring to the variation of FIG. 7.

With reference now to FIGS. 7 and 8, where details similar or identical to those already described are indicated for the sake of simplicity by the same reference numbers, the number 60b indicates as a whole a tubular component that replaces the component 6b in the box holder 1 already described, which is otherwise identical to what is illustrated in FIG. 6.

The tubular component 60b, open at the opposite ends, comprises at least two half-shells 11 and 12 and, according to the invention, a plurality of plastic hinges 14, 14c, 14d connecting to one another in one single piece the at least two half-shells 11,12 and/or which divide at least one of the at least two half-shells 11,12, in the non-limiting case illustrated both the half-shells 11,12, into a plurality of half-shell sectors 110 and 120 which are substantially rigid and, in the example illustrated, slightly curved and concave, in the manner of the rib 18.

The tubular component 60b is obtained identically to the component 6b by thermoforming starting from a flat sheet 60k of thermoplastic material, which is compressed and heated between a pair of tools 201,202 to obtain a semi-finished piece 60c shaped flat, which is then bent along the plastic hinges 14,14c,14d to obtain the tubular component 60b of FIG. 7 after introducing into the interior thereof the drum 3 with the relative spring 5, the tonneau device 2 and the tie rod 37.

During the thermoforming phase, the sheet 60k which is still cold and flat can be overlaid with one or more sheets 600 of materials of various type, for example fabric, or synthetic plastic resin films, also foamed, if necessary with the interposition of suitable adhesives which, during the compression and heating phase performed by the tools 201,202, are made integral in one piece with the sheet 60k, both in order to provide a mechanical reinforcement and, above all, to create a finishing layer 250 with the desired appearance which, once the process is finished, completely covers the outer surface of the tubular component 60b.

In the example illustrated, the half-shell 11 is divided by a plastic hinge 14d into two half-shell sectors 110; the plastic hinge 14d is made in several parts, by means of a rigid curved concave rib 18 and by means of a pair of flat rigid ribs 180 connected to each other and to the half-shell sectors 110, in one single piece, by means of elastically deformable tongues 14b to form, with the semi-finished piece 60c bent to form the component 60b, a substantially rigid longitudinal stiffening rib 140 for the box-like body 6. In this case, the hinge axis defined by the rib 18 is laterally spaced apart from an outer lateral surface 25 of the half-shells 11,12 and/or half-shell sectors 110,120.

The half-shell 11 is integrally connected in one single piece to the half-shell 12 by a plastic hinge 14 defined by a simple deformable tongue, and is in turn divided into three half-shell sectors 120 by two plastic hinges 14c each defined in turn by a simple flexible tongue.

In this way, or in similar ways, by combining several hinges 14,1c,14d, it is possible to obtain box-like bodies 6 of complex shape, impossible to obtain with the common injection moulding techniques.

The longitudinal sides 17 of the half-shells 11,12 define, with the half-shells 11,12 coupled, i.e. with the semi-finished piece 60c bent to form the tubular component 60b, the longitudinal slot 7 of the box-like body 6.

According to a further embodiment of the invention, the sides 17 are folded towards the inside of the box-like body 6 so as to present respective longitudinal end portions 170 bent at an acute angle, preferably forming angles of different size, and so as to form at a lower edge of the longitudinal slot 7 a substantially flat horizontal supporting surface 171 for the retractable element 4 of the tonneau device 2.

The outer lateral surface 25 of the half-shells 11,12 and/or half-shell sectors 110,120 is covered by the functional finishing layer 250 obtained by means of the technique of thermoforming, which extends over all the longitudinal bent end portions 170 of the second longitudinal sides 17 of the half-shells 11,12 and therefore also on the supporting surface 171 for the retractable element 4. In this way, the traditional shock-proof and noise-proof elements of the tonneau device 2 can be omitted, since their function is performed by the portion of finishing layer 250 which covers the end portions 170 of the longitudinal sides 17.

The invention claimed is:

1. A box holder of a tonneau cover device for a luggage space of a vehicle comprising an internally hollow body accommodating the tonneau device therein, and provided with a longitudinal slot for extracting a retractable member of the tonneau device, the body comprising opposite closed ends, adapted to be received in use in respective support pockets carried by the vehicle body and defined by a pair of opposite cup-shaped heads; the holder further comprising a releasable coupling device operatively associated with the pockets, the coupling device being carried by the closed ends of the body; wherein in combination (i) an upper part of the body carries a transport handle;
   (ii) the releasable coupling device comprises: at least one lockbolt slidingly carried parallel to said longitudinal slot and against the bias of a first contrast spring within a through seat obtained through one of said heads, the first contrast spring normally maintaining the lockbolt in an extracted position from the seat, in which a portion of the lockbolt externally protrudes from the body; a tie rod accommodated inside the body, and integrally connected to the lockbolt; and a control member adapted to pull the tie rod when it is actuated for attracting the lockbolt into a retracted position in the seat, in which retracted position the lockbolt is not adapted to lock the head in a respective supporting pocket in use; and
   (iii) the control member being integrated in said transport handle.

2. The holder according to claim 1, wherein the control member of the tie rod is located within a grip member of said handle, which is restrained in a pivoting manner to said part arranged in use facing towards the top of the body in a direction perpendicular to said longitudinal slot and against the bias of a second helical contrast spring arranged with the winding axis thereof substantially vertical in use; the second spring being sandwiched between one end of the grip member integrally restrained to the tie rod and an inner surface portion of a badge or plate belonging to the handle and snappingly restrained, in an integral manner, to the part arranged in use facing towards the top of the body.

3. The holder according to claim 2, wherein the handle is provided with a button accommodated in a through seat obtained through the grip member; the button sliding into the seat parallel to said longitudinal slot and being obtained integrally in one piece with a safety lockbolt, adapted to selectively make the grip member integral with the plate or badge and/or directly with the part arranged in use facing towards the top of the body to stop the rotation of the grip member when the button is pushed towards said end of the grip member.

4. The holder according to claim 1, wherein the control member is a lever protruding laterally and carried by the handle, the lever being hinged to the handle at a rotation axis perpendicular to said longitudinal slot and being eccentrically connected to said tie rod at the rotation axis.

5. The holder according to claim 1, wherein said cup-shaped heads support on the inside of the body opposite ends of a drum supporting the tonneau device, so that the tonneau device is sandwiched between the cup-shaped heads.

6. A box holder of a tonneau cover device for a luggage space of a vehicle comprising an internally hollow body accommodating the tonneau device therein, and provided with a longitudinal slot for extracting a retractable member of the tonneau device, the body comprising opposite closed ends, adapted to be received in use in respective support pockets carried by the vehicle body; the holder (1) further comprising a releasable coupling device operable associated with the pockets, the coupling device being carried by the closed ends of the body; wherein the body comprises: at least two half-shells; a plurality of plastic hinges connecting to one another in one single piece the at least two half-shells and dividing at least one of the at least two half-shells into a plurality of substantially rigid sectors so that the half-shells are reciprocally couplable by overlapping with respective concavities thereof facing each other and with respective opposite first longitudinal delimitation sides thereof arranged mutually adjacent to each other and connected in one piece to each other by means of at least one plastic hinge; and a pair of opposite cup-shaped heads which, with the half-shells coupled, are fitted on/arranged integral with corresponding opposite ends of the half-shells, to form said closed ends of the body; opposite second longitudinal sides of the half-shells, opposite to the first sides, defining, with the half-shells being coupled, the longitudinal slot of the body there between, being arranged spaced apart from one another; in which said half-shells have been thermoformed in one piece together with the plastic hinges defined by at least one deformable tongue, which joins to each other the half-shells and adjacent sectors of a half-shell parallel to the respective opposite first adjacent longitudinal sides of the half-shells, so that the half-shells are reciprocally couplable by overlapping by relative rotation of the half-shells and/or of the adjacent sectors of a half-shell; said half-shells and said plastic hinges having been obtained by thermoforming from a single sheet made of thermoplastic material; said opposite ends of the half-shells are open ends and defined by lower-thickness edges of the half-shells and/or half-shell sectors on which/to which, with the half-shells coupled, said cup-shaped heads are coupled so as to avoid separation of the half-shells and, preferably, so that an outer surface thereof is arranged substantially flush with a corresponding outer lateral surface of the half-shells.

7. The holder according to claim 6, wherein said at least one deformable tongue for each plastic hinge joins the half-shells and/or the adjacent sectors of at least one half-shell substantially over the whole length of the first sides, except for respective end segments thereof, which delimit said opposite ends of the half-shells.

8. The holder according to claim 6, wherein at least one said plastic hinge comprises a first and a second deformable tongue obtained in one piece, respectively, with a first and a second half-shell or half-shell sector, substantially along the whole corresponding first side of the half-shells, except for respective opposite end segments thereof which delimit said opposite ends of the half-shells; and a rigid curved rib as long as the half-shells and obtained integral in one piece with said tongues so as to connect them together over the whole length of the tongues themselves, so as to define a rotation axis of the plastic hinge laterally spaced apart by an outer lateral surface of the half-shells and/or half-shell sectors.

9. The holder according to claim 6, wherein said cup-shaped heads are driven by interference or snap-fitted and/or thermo-welded or ultrasound-welded and/or glued, vibration welded, hot welded or dovetail coupled onto/to said ends of the half-shells.

10. The holder according to one of the claims from 6, wherein, with the half-shells coupled, the first and second sides of the half-shells are arranged on offset planes, so that the first sides and said slot are reciprocally offset in height.

11. The holder according to one of the claims from 6, wherein said second longitudinal sides of the half-shells which define between them, with the half-shells coupled, the longitudinal slot of the body, are folded towards the inside of the body so as to present respective longitudinal end portions bent at an acute angle, forming angles of different size and so as to form at a lower edge of the longitudinal slot a substantially flat and horizontal supporting surface for said retractable member of the tonneau device; an outer lateral surface of the half-shells and/or half-shell sectors being covered by a functional finishing layer which extends over all the longitudinal bent end portions of the second longitudinal sides of the half-shells and therefore on said substantially flat and horizontal supporting surface for said retractable member.

12. A box holder comprising
an internally hollow body provided with a longitudinal slot, the body comprising an upper part comprising a transport handle; and opposite closed ends that are defined by a pair of opposite cup-shaped heads; and
a releasable coupling device configured to be operatively associated with support pockets of a vehicle body, the releasable coupling device being carried by the closed ends of the body; wherein the releasable coupling device comprises:
at least one lockbolt slidingly carried parallel to said longitudinal slot and against the bias of a first contrast spring within a through seat obtained through one of said heads, the first contrast spring normally maintaining the lockbolt in an extracted position from the seat, in which a portion of the lockbolt externally protrudes from the body;
a tie rod accommodated inside the body, and integrally connected to the lockbolt; and a control member adapted to pull the tie rod when it is actuated for attracting the lockbolt into a retracted position in the seat, in which retracted position the lockbolt is not adapted to lock the head in a respective supporting pocket in use; and wherein the control member is integrated in said transport handle.

13. The holder according to claim 12, wherein the control member of the tie rod is located within a grip member of said handle, which is restrained in a pivoting manner to said part arranged in use facing towards the top of the body in a direction perpendicular to said longitudinal slot and against the bias of a second helical contrast spring arranged with the winding axis thereof substantially vertical in use; the second spring being sandwiched between one end of the grip member integrally restrained to the tie rod and an inner surface portion of a badge or plate belonging to the handle and snappingly restrained, in an integral manner, to the part arranged in use facing towards the top of the body.

14. The holder according to claim 13, wherein the handle is comprises a button accommodated in a through seat obtained through the grip member; the button sliding into the seat parallel to said longitudinal slot and being obtained integrally in one piece with a safety lockbolt, adapted to selectively make the grip member integral with the plate or badge and/or directly with the part arranged in use facing towards the top of the body to stop the rotation of the grip member when the button is pushed towards said end of the grip member.

15. The holder according to claim 13, wherein the control member is a lever protruding laterally carried by the handle, the lever being hinged to the handle at a rotation axis perpendicular to said longitudinal slot and being eccentrically connected to said tie rod at the rotation axis.

* * * * *